(12) United States Patent
Rose

(10) Patent No.: US 6,791,493 B1
(45) Date of Patent: Sep. 14, 2004

(54) METHOD FOR USING SIGNAL FREQUENCY CHANGE TO DIFFERENTIALLY RESOLVE LONG BASELINE INTERFEROMETER MEASUREMENTS

(75) Inventor: Conrad Rose, King George, VA (US)

(73) Assignee: Northrop Grumman Corporation, Los Angeles, CA (US)

( * ) Notice: Subject to any disclaimer, the term of this patent is extended or adjusted under 35 U.S.C. 154(b) by 0 days.

(21) Appl. No.: 10/644,929

(22) Filed: Aug. 21, 2003

(51) Int. Cl.$^7$ ................................................ G01S 5/04
(52) U.S. Cl. ...................................... 342/442; 342/156
(58) Field of Search .................................. 342/442, 156

(56) References Cited

U.S. PATENT DOCUMENTS

| | | | |
|---|---|---|---|
| 4,734,702 A | 3/1988 | Kaplan et al. | |
| 5,652,590 A | 7/1997 | Deaton et al. | |
| 5,999,129 A | * 12/1999 | Rose | ........................... 342/394 |
| 6,313,794 B1 | * 11/2001 | Rose | ........................... 342/424 |
| 6,411,249 B1 | 6/2002 | Rose et al. | |

* cited by examiner

*Primary Examiner*—Theodore M. Blum
(74) *Attorney, Agent, or Firm*—Lowe Hauptman GIlman & Berner, LLP

(57) ABSTRACT

A method of and apparatus for passively determining agile-frequency-emitter location and computer-readable medium bearing instructions therefor. Unless a specified accuracy threshold is met or exceeded, phase, frequency, and baseline position are measured during a single receiver dwell and processed. An array of gains and phase difference ambiguity integers for all phase difference measurements are computed. An emitter DOA unit vector or COS(AOA) is estimated and an LBI phase difference is predicted. If the rank of the set of baseline-frequency product differences is greater than 1, each DOA unit vector is projected and scaled by the measured frequency corresponding to the baseline measurement. Otherwise, if the rank is 1, the product of the COS(AOA) and baseline length is formed and scaled by the measured frequency. The corresponding ambiguous measured phase difference, resolved and differenced, is used to estimate the resulting integer value and the resolved phase change and emitter range is estimated from the angle change.

54 Claims, 10 Drawing Sheets

*Figure 1. Interferometer and signal direction-of-arrival geometry*

PRIOR ART

METHOD FOR USING SIGNAL FREQUENCY CHANGE TO DIFFERENTIALLY RESOLVE LONG BASELINE INTERFEROMETER MEASUREMENTS

FIELD OF THE INVENTION

The present invention relates generally to locating frequency agile emitters using RF interferometers, and more specifically, the present invention relates to using a long baseline interferometer (LBI) to make ambiguous and biased signal direction-of-arrival (DOA) phase measurements in a sequence of receiver dwells, possibly all at different signal frequencies, and to locate the emitter by forming phase change estimates by taking differences of the phase measurements between these dwells.

BACKGROUND OF THE INVENTION

FIG. 1 illustrates the relationship between interferometer baseline, emitter signal angle of arrival, emitter direction of arrival unit vector, and receiver phase measurement fundamental to the understanding of the present invention.

FIG. 1 relates LBI phase measurement to emitter DOA. The LBI baseline 102 is created by antennas 100 and 101. The true phase 104 is the vector dot product of the emitter direction-of-arrival unit vector 106 onto the LBI baseline 102 scaled by the emitter RF carrier frequency f and speed-of-light c, as described by Equation 1:

$$\phi = \frac{f}{c}\vec{d}\cdot\vec{u} \quad (1)$$

However, phase measurement 105 is only measured modulo one cycle by the phase detector 107, i.e., as described by Equation 2:

$$\phi_m = \phi\mathrm{mod}(1\ \mathrm{cycle}) = \frac{f}{c}\vec{d}\cdot\vec{u} - n \quad (2)$$

where the integer n is the number of cycles subtracted from the true phase so that the measured phase satisfies the inequality:

$$-\frac{1}{2} < \phi_m \le \frac{1}{2}$$

Determining n to recover the relationship in Equation 1 from Equation 2 is called resolving the phase measurement.

For long baseline interferometers, the inability to robustly and economically calibrate the large cable runs 109 from antennae 100, 101 to receiver means a large unknown bias error 110 is typically present in the LBI phase measurement. But it is well established that accurate emitter range estimation requires only precise measurement of the emitter bearing rate-of-change. See for example, A. L. Haywood "Passive Ranging by Phase-Rate Techniques" (Wright-Patterson AFB Tech. Report ASD-TR-70-46 December 1970). In practice, discrete time phase differences rather than phase rates are used, i.e., as described by Equation 3:

$$\phi_m(t_2) - \phi_m(t_1) = \frac{f}{c}\vec{d}_2\cdot\vec{u}_2 - \frac{f}{c}\vec{d}_1\cdot\vec{u}_1 + n_1 - n_2 \quad (3)$$

Here, the phase differences are determined based on measurements typically made one second or more apart.

Using the phase difference, rather than phase, to locate the emitter means the bias errors 110 on the individual measurement from antennae 100, 101 cancel. It also means differential, and not absolute, phase ambiguity resolution of the LBI baseline is required. Kaplan, in "Passive Ranging Method and Apparatus", U.S. Pat. No. 4,734,702, described how to resolve the differential phase measurement ambiguity $m = n_2 - n_1$ utilizing a short baseline interferometer (SBI).

The SBI can be a planar interferometer that measures $\vec{u}_{sbi}$. Then, using the procedure outlined in Kaplan, the SBI DOA unit vectors measured at two different points in time, times 1 and 2, are dotted onto the LBI baseline to predict the LBI unambiguous phase and allow m to be found according to Equation 4:

$$m = n_1 - n_2 = \mathrm{nint}\left(\phi_m(t_2) - \phi_m(t_1) - \frac{f}{c}\vec{d}_2\cdot\vec{u}_{sbi2} + \frac{f}{c}\vec{d}_1\cdot\vec{u}_{sbi1}\right) \quad (4)$$

where nint is the nearest integer function.

FIG. 2 depicts a realization of the SBI/LBI method using only a linear SBI 200. A linear or one-dimensional interferometer measures AOA (108, FIG. 1) not $\vec{u}_{sbi}$ (equivalent to 106, FIG. 1). In this case, Equation 4 is utilized in a special sensor-oriented coordinate system, such as the ijk set 103 depicted in FIG. 1. In such sensor coordinates, Equation 4 becomes Equation 5:

$$n_1 - n_2 = \mathrm{nint}\left(\phi_m(t_2) - \phi_m(t_1) - \frac{f_2}{c}L\cos(AOA)_{sbi2} + \frac{f_1}{c}L\cos(AOA)_{sbi1}\right) \quad (5)$$

where the obvious modification to handle different frequencies $f_1$ and $f_2$ at each phase measurement has also been incorporated, and L (FIG. 1, 111) is the baseline length. The processing indicated by Equation 5 occurs in process step 202, (FIG. 2). The ambiguity integer is added at step 203 to the measured ambiguous phase determined at step 210, and ambiguous phase change related to emitter range is resolved at step 204, allowing the emitter location to be determined and output, i.e. emitter range and bearing found.

As Equation 1 indicates, to the first order, the resolved LBI phase difference may contain components due to baseline motion and frequency change, as well as phase change due to motion relative to the emitter as described by Equation 6: The component containing emitter-range information, and hence generating the phase change specifically considered by Haywood and Kaplan, is given by the second term, i.e., as described by Equation 7:

$$\Delta\phi_{range} = \frac{f}{c}\vec{d}\cdot\Delta\vec{u} \quad (7)$$

This relation forms the basis for the step 204 processing in conventional SBI/LBI implementations used to locate frequency stable, or non-frequency agile emitters. Against frequency agile emitters, perturbations to the phase due to frequency changes must be accounted for before employing Equation (7).

As shown by the third term in Equation 6, emitter frequency agility alters the Δ phase-range relation by introducing a frequency-change and DOA dependent factor. But, as Equation 5 demonstrates, this does not create a problem in SBI/LBI ambiguity resolution if the SBI itself can be resolved. However, SBI design techniques, e.g. as described by Robert L. Goodwin, in "Ambiguity-Resistant Three and Four-Channel Interferometers", (Naval Research Laboratory, Washington, D.C. Report 8005, Sep. 9, 1976), typically assume the same RF carrier frequency for all pulses used to estimate the phase ambiguities and generate COS(AOA). This assumption is almost always valid if the phase across all baselines is measured on the same pulse. Emitter frequency may change intrapulse, e.g. chirped signals, but this is comparatively rare. However, monopulse measurements require a separate receiver pair and phase detector for each SBI baseline. These systems are expensive in terms of both weight and cost and do not exploit the fact that the LBI measurement requires only a single, two channel system, 205 (FIG. 2).

Such a two channel system used with an SBI requires baseline switching, e.g., using an RF switch 201 to connect a single pair of receivers and phase detector 211 sequentially between SBI interferometer antennae 206. Frequency is "simultaneously" obtained by the instantaneous frequency measurement (IFM) module 207. In this method, the minimum number of pulses collected for a single emitter equals the number of interferometer baselines. But against pulse-to-pulse agile emitters, the IFM measures a different frequency for each pulse. Then, when employing conventional processing, such as described by Goodwin, the SBI ability to resolve phase ambiguities at process step 208 and subsequently use the resolved phase ambiguities to estimate COS(AOA) at step 209 totally fails. Hence, this most desirable two-channel SBI/LBI implementation cannot be used against frequency agile emitters.

Denton, in "Exploitation of Emitter RF Agility for Unambiguous Interferometer Direction Finding", U.S. Pat. No. 5,652,590 (hereinafter referred to as the '590 patent), has demonstrated a way, specific to frequency agile signals, to overcome the above-described two-channel-system drawback by not using an SBI to estimate the COS(AOA). Denton considers the specialization of Equation 1 to sensor coordinates, e.g. ijk, 103 (FIG. 1), as described by Equation 8:

$$\phi = \frac{f}{c} L \cos(AOA) \quad (8)$$

(with his $\theta = \pi/2 - AOA$) and notes that for emitters with continuously varying frequency, and systems with continuous phase measurements, COS(AOA) can be estimated from the derivative of phase with respect to frequency, i.e., as described by Equation 9:

$$\cos(AOA) = \frac{c}{L} \frac{d\phi}{df} \quad (9)$$

FIG. 3 indicates how Denton's technique may be combined with the LBI ambiguity resolution portion of Kaplan's approach, as depicted in FIG. 2, to perform phase-rate passive ranging against frequency agile emitters. Process esteps 330 and 340, which are embodiments of steps 24 and 25, FIG. 2 of the Denton patent, replace the SBI in Kaplan's method. The COS(AOA) found via Equation 9 is then used in process step 350 to resolve the LBI between receiver dwells in a manner entirely analogous to the use of the SBI estimate in step 202, (FIG. 2).

Basing COS(AOA) extraction on the relation in Equation 9 assumes the only contributor to phase change in Equation 6 is frequency, that is as described by Equation 10:

$$\Delta\phi = \frac{\Delta f}{c} \vec{d} \cdot \vec{u} \quad (10)$$

Based on the above, the baseline 102 (FIG. 1) cannot change relative to the DOA unit vector $\vec{u}$ 106 in a manner causing the relative AOA 108 in Equation 9 to change. Since $\vec{u}$ is essentially constant over the short time span COS(AOA) is estimated, this means the baseline $\vec{d}$ must be fixed in space (or restricted to motion on a cone with axial angle AOA about $\vec{u}$), i.e. that the term $$\frac{f}{c} \Delta \vec{d} \cdot \vec{u}$$

in Equation 6 is vanishingly small. As will be seen, this can greatly limit the aircraft's permissible attitude change, e.g. ability to roll or yaw during the rate estimation process.

Another limitation arises from the fact most agile radars have pulsed signals, thereby rendering continuous time phase and frequency measurements unavailable. Against pulsed signals, the smallest time step possible is one pulse repetition interval (PRI). So, in implementing the method of the '590 patent, Equation 10 is used to approximate the differentials in Equation 9, where the minimum discrete phase and frequency difference is over a PRI. This assumes the emitter is pulse-to-pulse frequency agile, because Denton requires a different frequency at each discrete phase measurement used to approximate the derivative. If the emitter is batch agile, the differences may span many PRI.

For pulsed signals in particular, the method of the '590 patent also requires that the phase difference in Equation 10 be unambiguous. Denton states, "If two discrete frequencies are measured, the total phase range must be unambiguous, requiring a limit on the baseline length or the frequency range." Thus, in applying his technique, the measured phase differences $\Delta\phi_m$ must satisfy Equation 11a:

$$\Delta\phi_m = \Delta\phi = \frac{\Delta f}{c} \vec{d} \cdot \vec{u} \quad (11a)$$

and not Equation 11b:

$$\Delta\phi_m = \Delta\phi \mod(1 \text{ cycle}) = \frac{\Delta f}{c} \vec{d} \cdot \vec{u} - p \quad (11b)$$

where p is an ambiguity integer analogous to $n_1 - n_2$ in Equation 3. Since COS(AOA) is assumed constant in Equation 9, the unambiguous measurement requirement is equivalent to restricting the $$\frac{o d\phi}{L d f}$$

measured values to the interval ±1.

Denton notes that, for a signal at 13 dB receiver video signal-to-noise ratio, 600 pulses are required to satisfy his processing error constraints when the maximum frequency change is 100 MHz. FIG. 4 shows the first 100 samples of a typical 600 sample data collection set. In the simulation, the aircraft was flying straight and level with the 10 GHz emitter 90 nautical miles distant at 45° relative bearing, and the phase measured on a 40 foot LBI baseline. Spikes 401 and 402 result from jumps in the ambiguity integer p. Measurements with such jumps are readily rejected by restricting the COS(AOA) approximation values to only those in the interval ±1, indicated by upper boundary 403. Using the measurements in this region required actually collecting 613 pulses to get 600 usable samples, and from these samples the COS(AOA) was estimated to be 0.0122. This result was in excellent agreement with the true value of 0.0120.

FIG. 5 shows COS(AOA) estimation results for the same scenario, but with aircraft heading variations called "Dutch roll" added. Dutch roll is a coupled airframe lateral-direction oscillation which is dynamically stable. These small yawing-rolling variations, due to wing dihedral interaction with static airframe directional stability, are largely unavoidable and intrinsic to most aircraft suitable for LEI installations. Dutch roll introduces the phase change component $$\frac{f}{c}\Delta\vec{d}\cdot\vec{u}$$

which the method of the '590 patent neglects. Hence, it represents an increase in random measurement noise, described by equation element 112 of FIG. 1, when using Denton's method. Even though in the simulation the heading change was on the order of 1° or less, the long LBI baseline transforms the motion to an appreciable phase error. Now the measurements exceed the acceptance window 503 much more often because the measurement error variance has increased dramatically. Over 700 pulses had to be collected to obtain 600 estimates within the acceptance window. Now, not only cycle skips, indicated by reference numeral 501, but large phase errors, indicated by reference numeral 502, on unambiguous measurements push values outside the constraints of acceptance window 503. The average true COS (AOA) was 0.00667 in this simulation, but the estimated value was −0.278. The error in the AOA estimate is about 16.5°; which generates an error in predicted LBI phase much greater than ½ cycle, and is too large to correctly predict phase at step 350, (FIG. 3), on the 40 foot LBI baseline.

Dutch roll represents a relatively benign attitude change with small attitude change rates. Attitude change rates when the aircraft is intentionally maneuvering are much larger. For example, nominal, not extreme, roll rates are on the order of 60° per second. Thus, intentional attitude adjustments almost always result in a much greater baseline change than Dutch roll, and correspondingly much larger errors in the COS(AOA) estimate. FIG. 6 shows an example of the degradation in COS(AOA) measurement that occurs with an 8° per second yaw during the phase measurement interval. The number of ambiguity cycle skips 600 and large phase noise error 601 created by neglecting $f/c\Delta\vec{d}\cdot\vec{u}$, both causing the COS(AOA) estimate to fall outside the ±1 limit 602, have increased dramatically compared to the no-attitude-change case of FIG. 4. Over 1200 samples were required to get 600 estimates within the acceptance window. But the 600 estimates had such large equivalent phase error created by neglecting the baseline motion that the spatial angle was off by 48.7° from the true AOA. Thus, the estimate was useless.

These examples clearly indicate the method of the '590 patent fails when there are commonly experienced airframe attitude changes unless the induced phase error (601 of FIG. 6, 502 of FIG. 5) can be reduced by either greatly restricting the LBI baseline length or the allowable emitter frequency variations, or greatly extending the data collection interval.

These restrictions greatly limit the usefulness of the method. The main benefit of LBI passive ranging, i.e., rapid convergence to accurate emitter location estimates, depends on having a long LBI length. Also, there is absolutely no control over the emitter frequency behavior: many agile emitters of interest utilize large frequency changes. And extending the data collection requirement from that suggested by Denton is not compatible with other receiver performance requirements.

This is especially true since the 600 pulse requirement alone cannot realistically be supported in most LBI applications, even in the absence of any attitude change. The PRI assumed in the above test was 500 microseconds ($\mu$sec), so the 613 pulse data collection took about 0.3 seconds. Some emitter's have PRI on the order of 5,000 $\mu$sec, requiring 3 seconds of data collection. These times represent extremely long receiver dwells on a single emitter. This is disadvantageous as it is generally desirable to reduce the data collection time not only to limit the impact of attitude change on measured phase, but also to improve the receiver's radar revisit rate and ensure timely detection of new emitters. For all of the above reasons, SBI/LBI pulse collection is usually limited to two pulses per receiver dwell per baseline.

So for an SBI with six antennas, ten pulses are typically collected. It is desirable, at least under the ideal condition of no baseline rotation, to not exceed this number in order to assure all emitters in the environment are detected. But if only the first 10 pulses measured to generate the estimates in FIG. 4 are used in the method of U.S. Pat. No. 5,652,590 to find COS(AOA), the result is −0.0492, whereas the true value was 0.0120. Denton's 600 pulse requirement at 13 dB video SNR definitely cannot be relaxed, even under ideal conditions with the unrealistic assumption of absolutely no baseline attitude change.

In summary, a costly solution to LBI passive ranging against frequency agile emitters involves monopulse direction finding (DF). The method of the '590 patent provides a potential means to circumvent this costly approach; however, even under the best conditions, the method requires sixty times as many pulses as are conventionally collected to predict LBI phase. Further, even with 600 pulses, the method cannot accurately estimate COS(AOA) in the presence of aircraft attitude changes. Also, the magnitude of the allowable pulse-to-pulse frequency change must be restricted, or the length of the LBI baseline greatly restricted, to guarantee sufficient unambiguous phase difference measurements to perform the required 600 sample statistical processing at 13 dB SNR. Thus, the method described in the '590 patent is not a robust or practical frequency agile alternative to monopulse SBI for real flight regimes and desirable receiver tuning strategies, or against a significant number of emitters of interest.

These drawbacks stem partly from assuming phase change limited to satisfying Equation (11a) rather than incorporating a more realistic model of short-time phase change which depends also on baseline rotation as described by Equation 12:

$$\Delta\phi = \frac{f}{c}\Delta\vec{d}\cdot\vec{u} + \frac{\Delta f}{c}\vec{d}\cdot\vec{u} \qquad (12)$$

To handle baseline change according to this model the DOA unit vector must generally be estimated, not just AOA.

The drawbacks also stem from using the rate of phase change with respect to frequency to estimate AOA (24 and 25, FIG. 1 in the '590 patent). Estimating derivatives from noise-corrupted data requires extensive smoothing, hence the 600 pulse requirement. Also, estimating COS(AOA)

from a rate estimate does not provide an efficient way to utilize ambiguous phase differences, i.e. measurements satisfying Equation (11b). As a result, restrictions must be placed on the "frequency-change times baseline" product to ensure most measurements are unambiguous, and further hope that the RF signal is uniformly distributed over its agile bandwidth, or has another distribution guaranteeing a significant number of small frequency changes. But, even for a uniform frequency distribution, ambiguous measurements can make up most of the phase-difference estimates for a large class of agile emitters when only 10 pulse phase measurements are taken, as the results shown in FIG. 4 demonstrate. And because radars use frequency agility either as an electronic counter countermeasure (ECCM), or to enhance performance, there is no necessary reason for them to use a uniform frequency distribution. For example, an ECCM application is frequency hopping within a bandwidth, possibly extending over 1 GHz (compared to the 100 MHz bandwidth considered in the above examples), to reduce the vulnerability of surface-to-air missile systems to jamming. In doing this, the radar designer may place a limit on the minimum allowable frequency change. Such a radar may provide very few unambiguous phase differences on a 40 foot LBI baseline, even when 600 pulses are sampled.

The present invention overcomes these drawbacks and deficiencies by exploiting emitter frequency agility to estimate both COS(AOA) and $\vec{u}$, but does not use estimates of the rate of phase change with respect to frequency. The method requires only three frequency-phase measurements in high SNR conditions, and ten at 13 dB under ideal conditions. Although it can use an unlimited number of measurements, and places no intrinsic restriction on aircraft attitude change during the pulse collection process, the most required under the worst conditions studied is 60 measurements. Rapid attitude change may, in fact, generate more accurate angle estimates from fewer measurements than straight and level flight. Also, the new method places no restriction on the maximum allowable frequency change. Large frequency changes actually enhance the method performance and each measured phase difference can be ambiguous.

BRIEF DESCRIPTION OF THE DRAWINGS

The present invention is illustrated by way of example, and not by limitation, in the figures of the accompanying drawings, wherein elements having the same reference numeral designations represent like elements throughout and wherein.

SUMMARY OF THE INVENTION

Figure 1:
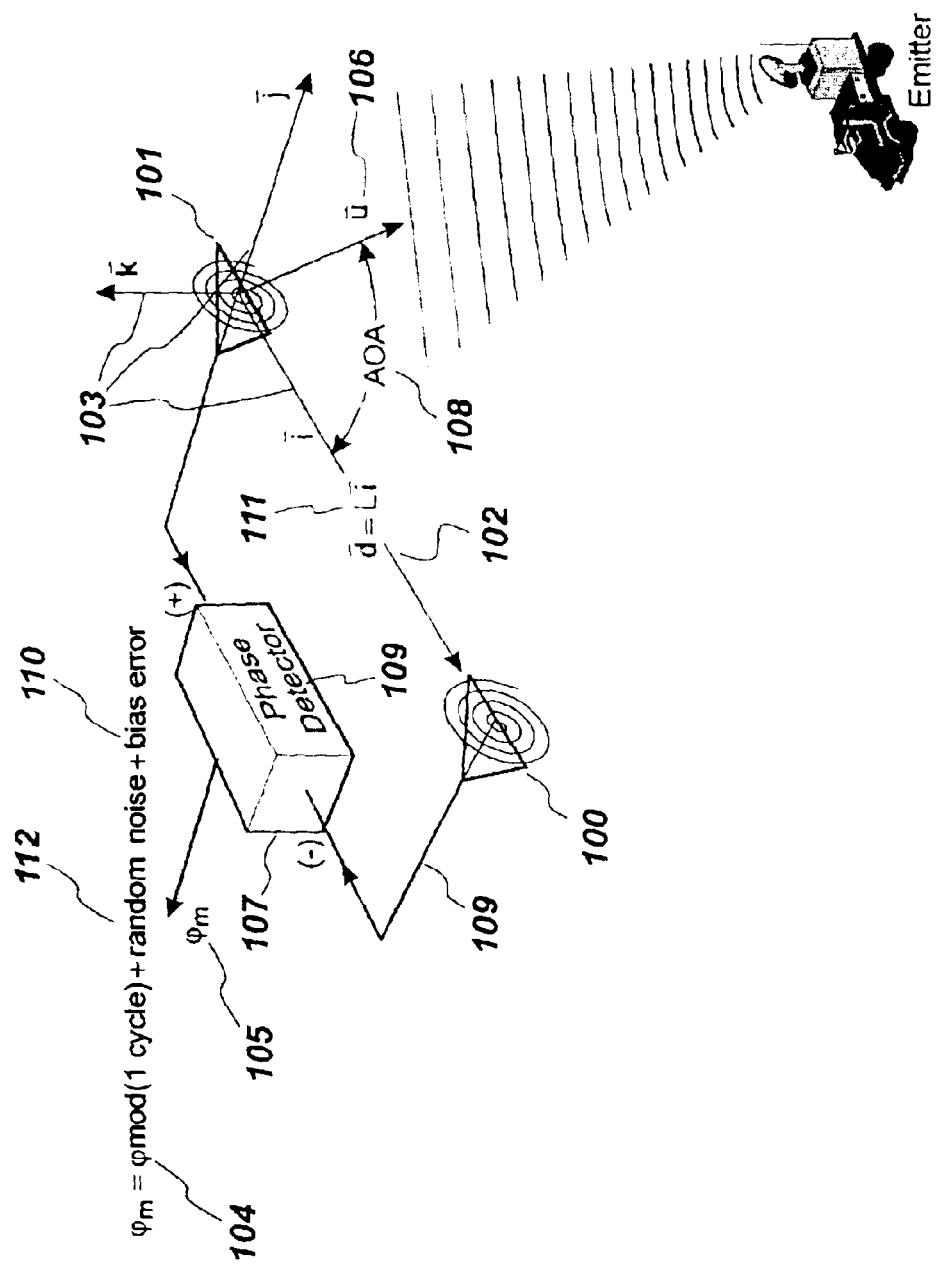
FIG. 1 illustrates a relationship between an interferometer baseline, an emitter signal angle of arrival, an emitter direction of arrival unit vector, and a receiver phase measurement important to the understanding of the present invention.

Another object of the present invention is to use frequency agility to estimate both COS (AOA) and $\vec{u}$ without using estimates of the rate of phase change with respect to frequency.

Another object of the present invention to use ph as e measurements satisfying the general relation, as described by Equation 13:

$$\phi_m(t_2) - \phi_m(t_1) = \frac{f_2}{c}\vec{d}_2 \cdot \vec{u} - \frac{f_1}{c}\vec{d}_1 \cdot \vec{u} + p_1 - p_2 \tag{13}$$

with $t_2$ close enough to $t_1$ that the DOA unit vector remains essentially constant over all the phase and frequency updates used to extract $\vec{u}$. The total sample times are typically on the order of milliseconds, while the individual measurement sample time is ultimately determined by the emitter frequency hop schedule and PRI. This relation is similar to that of Equation 12, but is not well approximated by Equation 11, and hence may not typically provide a good approximation to Equation 9.

It is a further object of the present invention to estimate the cycle ambiguity $p_1-p_2$ in this phase difference and hence recover the true phase change, as described by Equation 14:

$$\phi(t_2)-\phi(t_1)=\phi_m(t_2)-\phi_m(t_1)+p_1-p_2 \tag{14}$$

Yet another object of the present invention is to use all resolved sets thus formed in a receiver dwell, along with the frequency measurements, e.g. $f_1$, $f_2$, and LBI baselines such as $\vec{d}_1$ and $\vec{d}_2$, to estimate the DOA unit vector $\vec{u}$.

In performing the estimate, a key object of the invention is to predict, during the phase measurement process, the accuracy in the $\vec{u}$ estimate, and to continue making phase, frequency, and interferometer measurements, with the relationship of these quantities well approximated by Equation 13, until the predicted accuracy exceeds the required accuracy when all the measurements are incorporated in the estimation process.

Still another object of the present invention is to use the unit DOA vectors $\vec{u}_1$ estimated at receiver dwell 1 and $\vec{u}_2$ estimated in receiver dwell 2 in place of the respective $\vec{u}_{sbi}$ in Kaplan's method for resolving the LBI phase differences. That is, the present invention resolves the LBI phase difference between receiver dwells by estimating the cycle ambiguity through the relation $$n_i - n_j = \text{nint}\left(\phi_m(t_j) - \phi_m(t_i) - \frac{f_j}{c}\vec{d}_j \cdot \vec{u}_2 + \frac{f_i}{c}\vec{d}_i \cdot \vec{u}_1\right) \quad (15)$$

where $t_j = t_i + \Delta t$ and $\Delta t$ is typically on the order of a second.

These and other objects of the present invention are achieved by a method of passively determining agile-frequency-emitter location, including measuring and storing, during a single receiver dwell, ambiguous phase at a minimum of three different carrier frequencies on a single interferometer baseline, each frequency measurement allowing an interpolation to obtain a simultaneous estimate or measurement of frequency occurring simultaneous with a phase measurement, and similarly each corresponding interferometer baseline position measured or interpolated from measurements, so that the position is simultaneous to the phase and frequency measurements, processing the measurements by, multiplying each baseline by the corresponding frequency, forming a linearly independent set of differences of these baseline-frequency products, forming the corresponding set of phase differences, determining, when the measuring step has obtained sufficient phase, frequency and baseline measurements, and so when to start the next computing step, including predicting, using the linearly independent set of differences of baseline-frequency products, the accuracy of a direction of arrival unit vector or COS(AOA) that will be computed from the corresponding set of phase differences, continuing the measuring step until the predicted accuracy meets or exceeds a desired accuracy, computing an array A of gains from the set of baseline-frequency product differences, where there is a gain for each difference, and the sum of the differences weighed by each corresponding gain is the null vector, computing the phase difference ambiguity integers for all the phase difference measurements by processing the phase difference measurements corresponding to the set of baseline-frequency products by multiplying each phase difference with the corresponding gain, where the gain was determined in the previous computing step, summing these products to form a fundamental test metric, forming all possible sequences of permissible ambiguity integers, such that each sequence is an array having the same dimensions as the set of phase differences, testing each integer set thus formed by weighing each integer in the set with the corresponding gain found in the processing step above, summing these weighted values and choosing the sum closest to the fundamental test metric, resolving the set of phase differences with the set of integers whose sum has the value closest to that of the fundamental test metric by adding the integer array to the phase array, estimating the emitter DOA unit vector $\vec{u}$ or COS(AOA) by computing a second array A of gains from the set of baseline-frequency product differences, where the matrix product of the gains and differences is the identity matrix, determining the rank of the set of baseline-frequency product differences, estimating $\vec{u}$ if the rank is greater than 1, and COS(AOA) otherwise, by forming the matrix product of A with the phase differences corresponding to the baseline-frequency differences, predicting the LBI phase differences, the differences occurring between receiver dwells, by if the rank of the set of baseline-frequency product differences is greater than 1, projecting the DOA unit vector found in each dwell on a single baseline measured in that dwell, scaling the projected value by the measured frequency corresponding to the baseline measurement, else if it is %% not greater than %% 1, forming the product of the COS(AOA) and baseline length; scaling the product by the measured frequency corresponding to the measured phase being resolved, resolving the corresponding ambiguous measured phase difference by differencing the ambiguous phase difference with the predicted phase difference and estimating the resulting integer value, adding the integer value to the ambiguous phase, and associating the resolved phase change with spatial angle change and estimating emitter range from this angle change.

An apparatus aspect for passively determining agile-frequency-emitter location includes measuring means for measuring, during a single receiver dwell, phase at a minimum of three different carrier frequencies on a single interferometer baseline, wherein the measuring means is adapted to measure frequency, phase, and a corresponding interferometer baseline position; a processor for processing the measurements measured by the measuring means by (1) multiplying each baseline by the corresponding frequency, (2) forming a linearly independent set of differences of the baseline-frequency products, and (3) forming a corresponding set of phase differences; determining means for determining the measuring step has obtained sufficient phase, frequency, and baseline measurements by being adapted to (1) based on the linearly independent set of differences of baseline-frequency products produced by the processor, predict the accuracy of a direction of arrival unit vector or COS(AOA) to be computed from the corresponding set of phase differences, (2) cause repeated measuring by the measuring means and repeated processing by the processor until a predicted accuracy meets or exceeds a desired specified accuracy; computing means for computing (1) an array A of gains based on the set of baseline-frequency product differences, where there is a gain for each difference, and the sum of the differences weighted by the corresponding gain is a null vector and (2) the phase difference ambiguity integers for all the phase difference measurements by (a) processing the phase difference measurements corresponding to the set of baseline-frequency products by (i) multiplying each phase difference with the corresponding gain, where the gain was previously determined and (ii) summing the products to form a fundamental test metric; (b) forming all possible sequences of permissible ambiguity integers, such that each sequence is an array having the same dimensions as the set of phase differences; (c) testing each integer set thus formed by (i) weighting each integer in the set with the corresponding gain, (ii) summing the weighted values, and (iii) choosing the sum closest to the fundamental test metric; and (d) resolving the set of phase differences with the set of integers whose sum has the value closest to that of the fundamental test metric by adding the integer array to the phase array; estimating means for estimating the emitter DOA unit vector or COS(AOA) by (1) computing a second array L of gains from the set of baseline-frequency product differences, where the matrix product of the gains and differences is the identity matrix, (2) determining the rank of the set of baseline-frequency product differences, (3) estimating if the rank is greater than 1, and COS(AOA) otherwise, by forming the matrix product of L with the phase differences corresponding to the baseline-frequency differences; predicting means for predicting the LBI phase differences by (1) if the rank of the set of baseline-frequency product differences is greater than 1, the predicting means being adapted to (a) project the DOA unit vector found in each dwell on a single baseline measured in that dwell, (b) scale the projected value by the measured frequency corresponding to the baseline measurement, and (2) if the rank of the set of baseline-frequency product differences is 1, the predicting means being adapted to (a) form the product of the COS(AOA) and baseline length, (b) scale the product by the measured frequency corresponding to the measured phase being resolved, (c) resolve the corresponding ambiguous measured phase difference by (i) difference the ambiguous phase difference with the predicted phase difference and estimate the resulting integer value, (ii) add the integer value to the ambiguous phase, and (iii) associate the resolved phase change with spatial angle change and estimate emitter range from the angle change.

A computer-readable medium aspect includes a data structure for phase, frequency, and baseline position measurements; at least one sequence of machine executable instructions in machine form, wherein execution of the instructions by a processor cause the processor to:

measure during a single receiver dwell: phase at a minimum of three different carrier frequencies on a single interferometer baseline; wherein: each frequency measurement occurs with a phase measurement; and each corresponding interferometer baseline position, the position simultaneous to the phase and frequency measurements;

process the measurements measured by the measuring step by: multiplying each baseline by the corresponding frequency; forming a linearly independent set of differences of these baseline-frequency products; and forming the corresponding set of phase differences;

determine the measuring step has obtained sufficient phase, frequency and baseline measurements, comprising: based on the linearly independent set of differences of baseline-frequency products produced by the processing step, predicting the accuracy of a direction of arrival unit vector or COS(AOA) to be that will be computed from the corresponding set of phase differences; repeating the measuring step and processing step until the predicted accuracy meets or exceeds a desired specified accuracy;

compute an array A of gains based on the set of baseline-frequency product differences, where there is a gain for each difference, and the sum of the differences weighed by each corresponding gain is a null vector;

compute the phase difference ambiguity integers for all the phase difference measurements by: processing the phase difference measurements corresponding to the set of baseline-frequency products by: multiplying each phase difference with the corresponding gain, where the gain was previously determined; and summing these products to form a fundamental test metric; forming all possible sequences of permissible ambiguity integers, such that each sequence is an array having the same dimensions as the set of phase differences; testing each integer set thus formed by: weighting each integer in the set with the corresponding gain found in the processing step above; summing these weighted values; and choosing the sum closest to the fundamental test metric; and resolving the set of phase differences with the set of integers whose sum has the value closest to that of the fundamental test metric by adding the integer array to the phase array;

estimate the emitter DOA unit vector or COS(AOA) by: computing a second array L of gains from the set of baseline-frequency product differences, where the matrix product of the gains and differences is the identity matrix; determining the rank of the set of baseline-frequency product differences; estimating if the rank is greater than 1, and COS(AOA) otherwise, by forming the matrix product of L with the phase differences corresponding to the baseline-frequency differences;

predict the LBI phase differences, the differences occurring between receiver dwells, by: if the rank of the set of baseline-frequency product differences is greater than 1, performing the steps of: projecting the DOA unit vector found in each dwell on a single baseline measured in that dwell; and scaling the projected value by the measured frequency corresponding to the baseline measurement; else if the rank of the set of baseline-frequency product differences is 1, performing the steps of: forming the product of the COS(AOA) and baseline length; scaling the product by the measured frequency corresponding to the measured phase being resolved; resolving the corresponding ambiguous measured phase difference by: differencing the ambiguous phase difference with the predicted phase difference and estimating the resulting integer value; adding the integer value to the ambiguous phase; and associating the resolved phase change with spatial angle change and estimating emitter range from the angle change.

DETAILED DESCRIPTION

Figure 7:
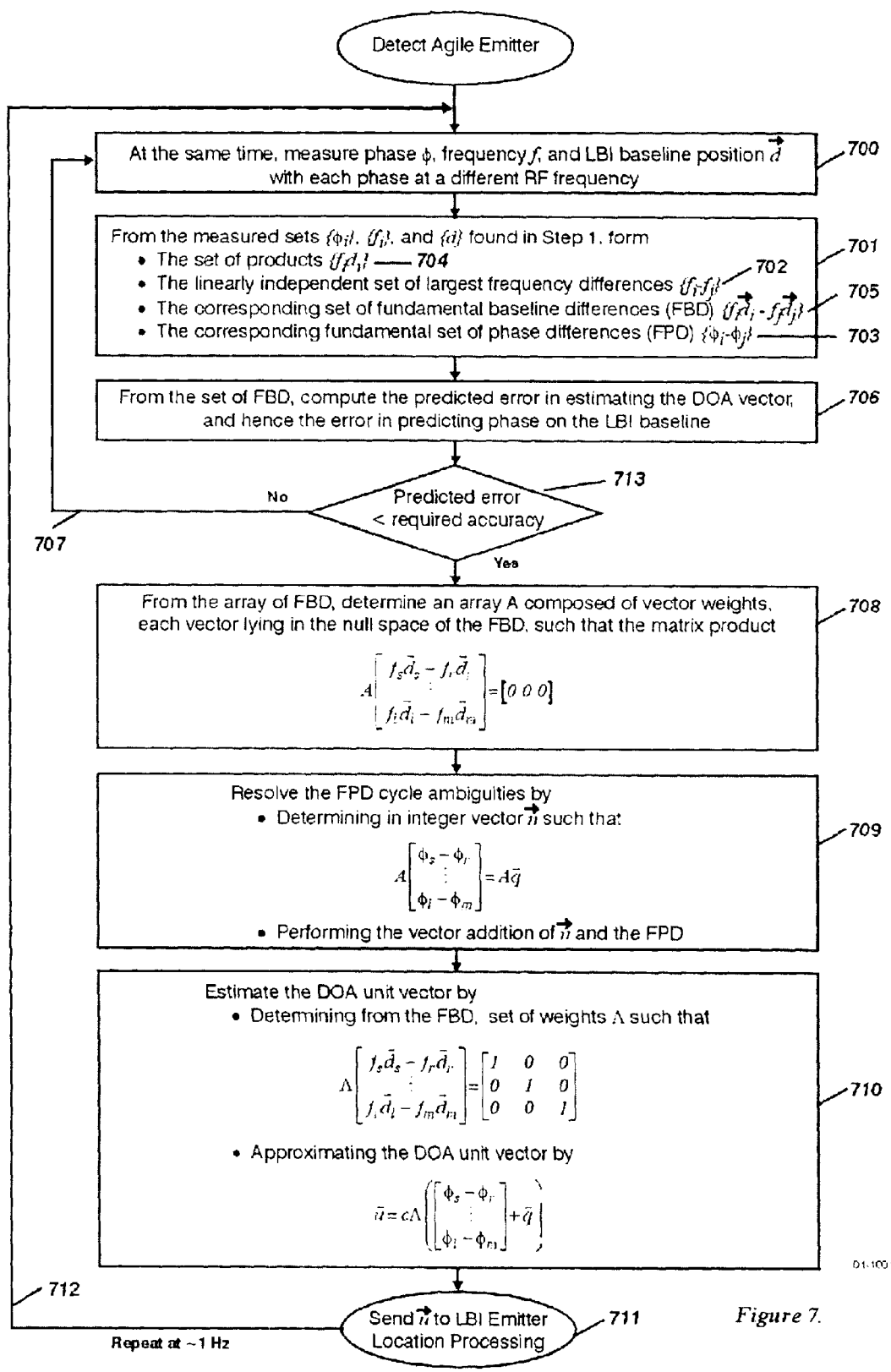
FIG. 7 is a flow diagram illustrating the process steps required to carry out a new method according to an embodiment of this the present invention.

FIG. 7 is a flow chart depicting the process steps performed to implement an embodiment according to the present invention.

In step 700, the LBI ambiguous phase 105 (FIG. 1) is measured, at a minimum of three different carrier frequencies; also recorded is the corresponding LBI baseline vector positions 102 at the time of each phase measurement. For pulse-to-pulse agile emitters these measurements can occur at each PRI. Thus, at time (m+1)·PRI, with m≧2, the set of m+1 triples $$[\phi_i f_i \vec{d}_i]$$

has been measured and stored.

In step 701, this the triples set is modified in two ways: by forming frequency-baseline products 704, and then by differencing the elements. It is desirable to perform the differencing by first finding the linearly independent set of frequency differences having the maximum frequency change over all differences in the set. It is to be understood that in different embodiments, the differencing can be performed in a different manner; however, it is more desirable to find the differences largest in magnitude in order to obtain the best noise immunity. This is exactly opposite the procedure for estimating the derivative of phase with respect to frequency, as performed in approximating Equation 9. In that case, the set of minimum frequency differences is desired. After finding the delta-frequencies at step 702, the corresponding phases and baseline- baseline-frequency products are differenced at steps 705 and 703, resulting in a new stored doublet set, having m rows, $$[\phi_l-\phi_m, f_l\vec{d}_l-f_m\vec{d}_m]$$

Figure 8A:
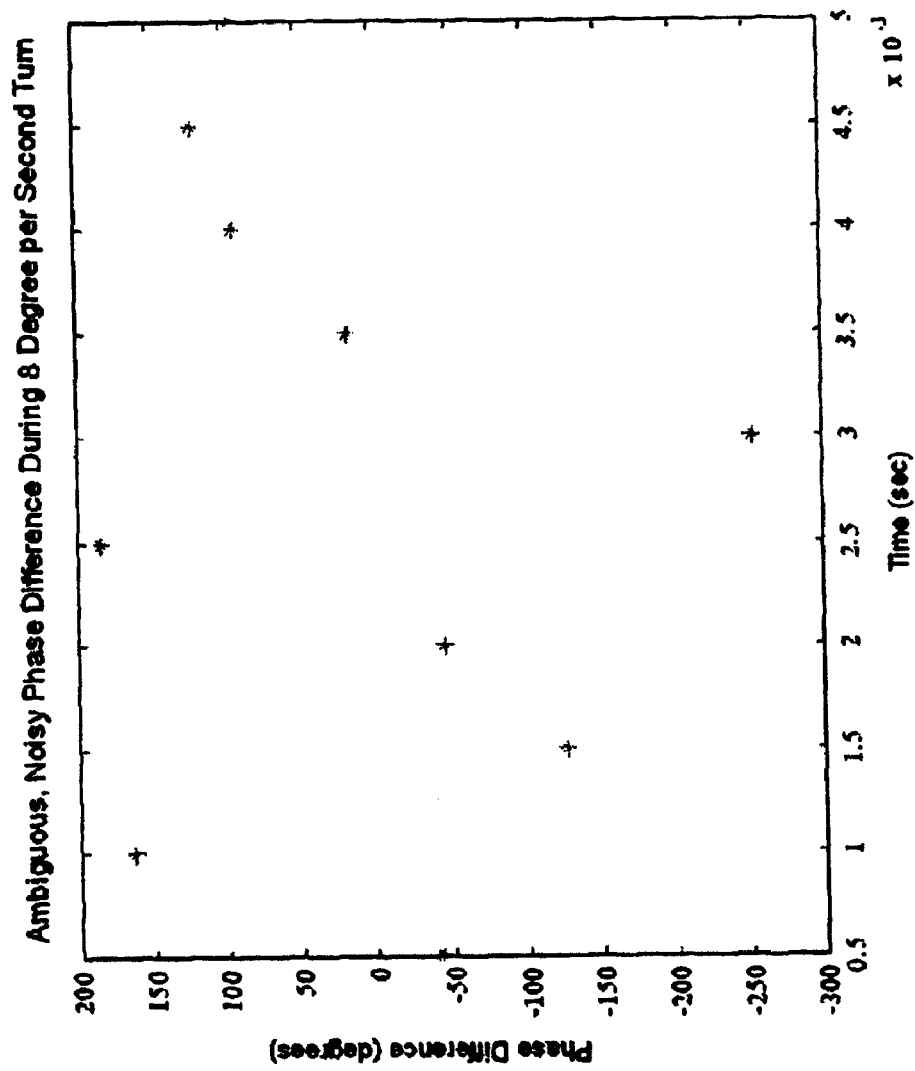
FIG. 8a shows the first 10 samples of a measured phase difference, approximately all ambiguous modulo 360°, from the simulation that generated the FIG. 6 COS(AOA) result; the samples are typical of the phase input used by an embodiment of the invention to compute the DOA unit vector $\vec{u}$.

The measured array $f_l\vec{d}_l-f_m\vec{d}_m$ is central to a method according to an embodiment of the present invention in determining the gains used to further process the phase differences. Hence, it is called the fundamental baseline difference (FBD) set. The corresponding phases that the gains determined in steps 708 and 710 will operate on are referred to subsequently as the fundamental phase difference (FPD) set. FIG. 8a illustrates an example of a typical FPD set, or ambiguous phase differences $\phi_l-\phi_k$. The differences were obtained from the first 11 phases measured in the simulation producing the FIG. 6 rapid yaw results.

The FBD set is also used as input to process step 706 in order to predict the DOA estimate accuracy to be achieved with the m-element doublet. This accuracy must be sufficient to provide the correct ambiguity integer in Equation 15. The accuracy improves as more measurements are available to the estimation process. If the predicted error is too large at step 713, more measurements and are made at step 707 and the process loops back to step 700. The frequency-baseline product 705 determines a new equivalent interferometer baseline. The accuracy of the DOA or AOA estimate is directly proportional to the new, virtual baseline and inversely proportional to the phase measurement error. The phase measurement error is determined from the signal-to-noise ratio (SNR) FIG. 9, 924. Basically, the iteration 707 keeps adding baselines until the impact of phase measurement error is reduced enough to calculate the desired spatial angle accuracy. The "baseline addition" is not in the sense of increasing the linear dimension of the virtual baseline with each iteration, but rather statistically adding independent baselines so the measurement phase error is reduced by one over the square root of the number of baselines, i.e., 1/sqrt (number of baselines). This is further described in detail below.

When enough FBD and FPD measurements are collected, i.e. the predicted error is not too large, an array of weights or gains $A=[\alpha_1 \ldots \alpha_m]$ is determined at step 708 from the FBD such that $$\sum_s \alpha_s(f_l\vec{d}_l - f_k\vec{d}_k)_s = [0 \ 0 \ 0]$$

The array A is thus specific to,the particular measurement frequency difference set 702, and must be recomputed for each new FBD set. Thus, array A is recomputed, for a given emitter, at about a 1 PRI rate, as new measurements are added. Finding A from the array of $f_l\vec{d}_l-f_m\vec{d}_m$ is a standard exercise in linear algebra, and very efficient algorithms exist to carry out the computation as is known to persons of skill in the art.

In step 709, the array of weights is applied to the set of ambiguous phase differences at output from step 703. Because all the measurements were made over a short time interval, even though the baseline vectors generally change, the DOA unit vector remains essentially constant. Hence, the ambiguous phase differences are related to the frequencies, baselines and ambiguity integers, to an excellent approximation, by Equation 13. Therefore, applying the weights to the phase differences, and applying Equation 13, provides the following relation between the unknown ambiguity integers $q_s=p_l-p_m$ and the measured phases:

$$\sum_s \alpha_s q_s = \sum_s \alpha_s(\phi_l - \phi_m)$$

Figure 8B:
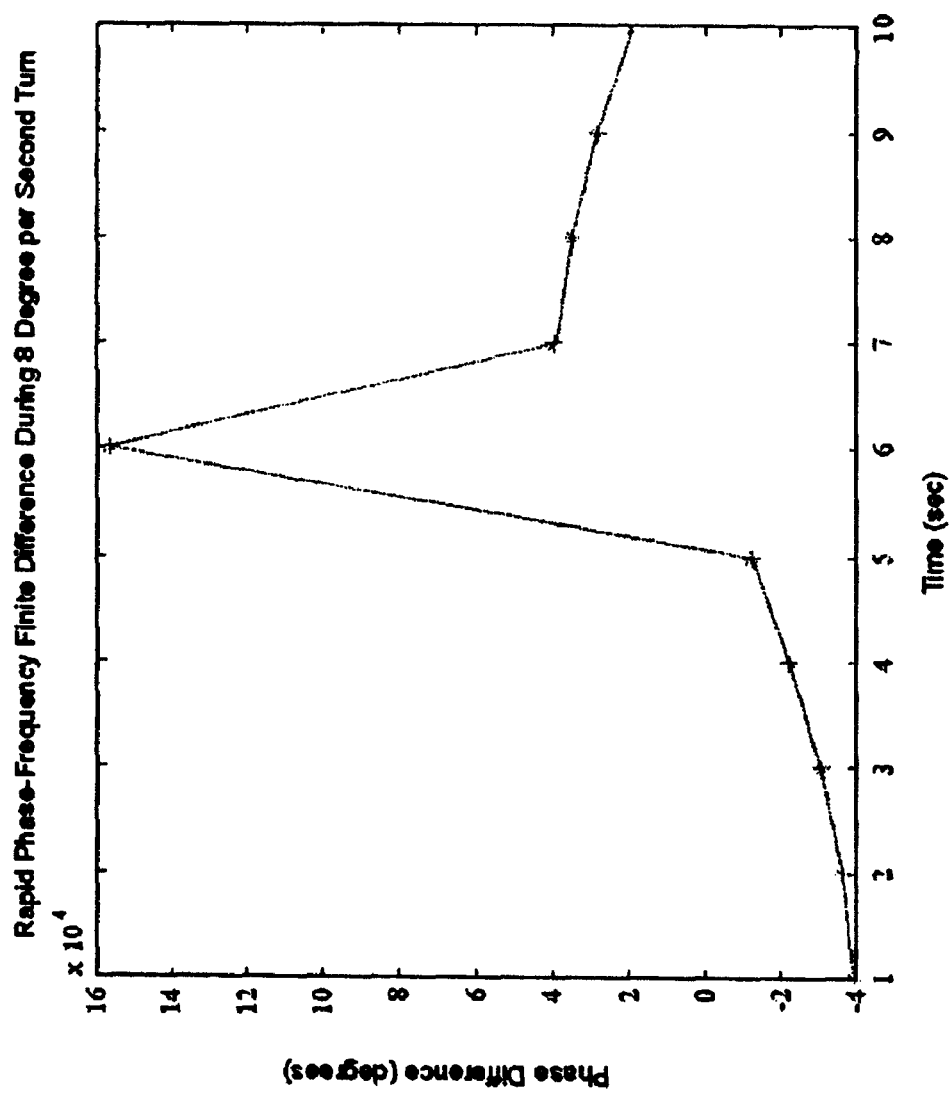
FIG. 8b shows illustrates the ambiguous phase differences in FIG. 8a resolved using the method according to the FIG. 7 embodiment of the present invention; note the true phase difference is several thousand electrical degrees, and not restricted to the interval ±180°, and hence the resolution provided by the invention in estimating AOA is orders of magnitude better than the previous method.

The range of possible integers $q_s$ is derived by the frequency differences determined in step 701 and LBI baselines measured in step 700. So, all allowable mx1 integer array combinations can be tested using the above relation to determine the correct one combination. Efficient "guess and check" processing algorithms are available to perform this testing as is known to persons of skill in the art. The correct integer set is added to the ambiguous phase difference, thus forming the resolved phases. FIG. 8b illustrates the resolved phase differences determined by this process corresponding to the ambiguous phase set illustrated in FIG. 8a.

Step 710 utilizes the resolved $\Delta\phi$ in a relation analogous to Equation 1, $$c[\phi_l-\phi_k+p_k-p_l]_{mx1}=[f_l\vec{d}_l-f_k\vec{d}_k]_{mx3} \vec{u}$$

where the phase set on the right is now resolved (FIG. 8b), and $\vec{u}$ is derived by determining a second array of weights $\Lambda$, having a dimension 3×m, from the FBD array, such that $$\Lambda[f_l\vec{d}_l - f_k\vec{d}_k] = \begin{bmatrix} 1 & 0 & 0 \\ 0 & 1 & 0 \\ 0 & 0 & 1 \end{bmatrix}$$

Thus, execution of process step 710 computes an array estimating the DOA unit vector from the resolved phase differences by a linear weighting, i.e.

$$\vec{u}=\Lambda[\phi_l-\phi_k+p_k-p_l]_{mx1}$$

$\Lambda$ is recomputed at about a 1 Hz rate and is not unique. Very efficient algorithms exist for computing $\Lambda$ from $f_l\vec{d}_l-f_m\vec{d}_m$ using pseudo inverse methods from linear algebra as is known.

The estimated DOA unit vector is used as input to process step 711 in Equation 15 with previously estimated unit vectors to resolve the LBI phase ambiguity for the receiver dwell-to-dwell phase differences. The unit vectors are estimated whenever the emitter is revisited for measurement updates to the LBI location algorithm. Process step 712 occurs at about a 1 Hz rate.

Figure 4:
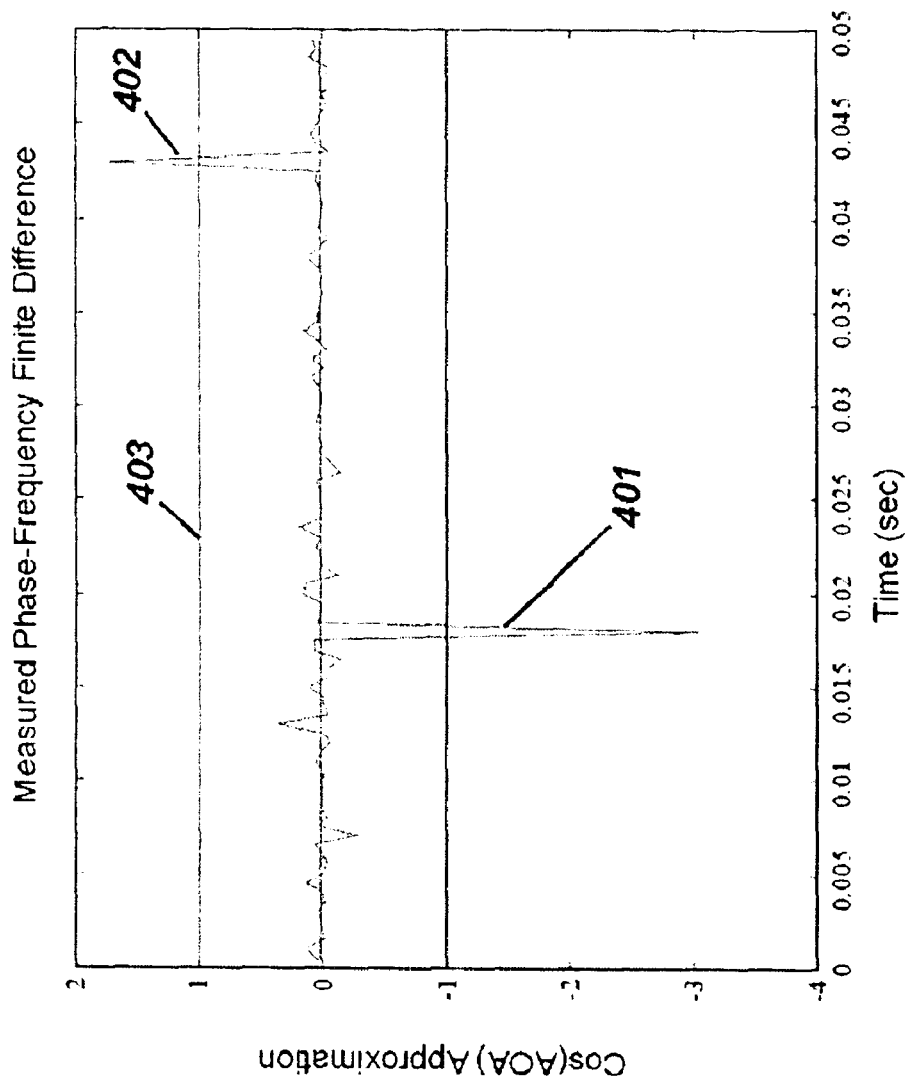
FIG. 4 shows illustrates a typical subset of COS(AOA) estimates determined utilizing the method of the '590 patent, with the a simulation assuming a 13 decibel (dB) video SNR, 500 μsec PRI, no rotational motion of the 40 foot LBI baseline, frequency centered at 10 GHz, randomly distributed, with a uniform distribution about the center frequency having a 100 MHz bandwidth.
Figure 5:
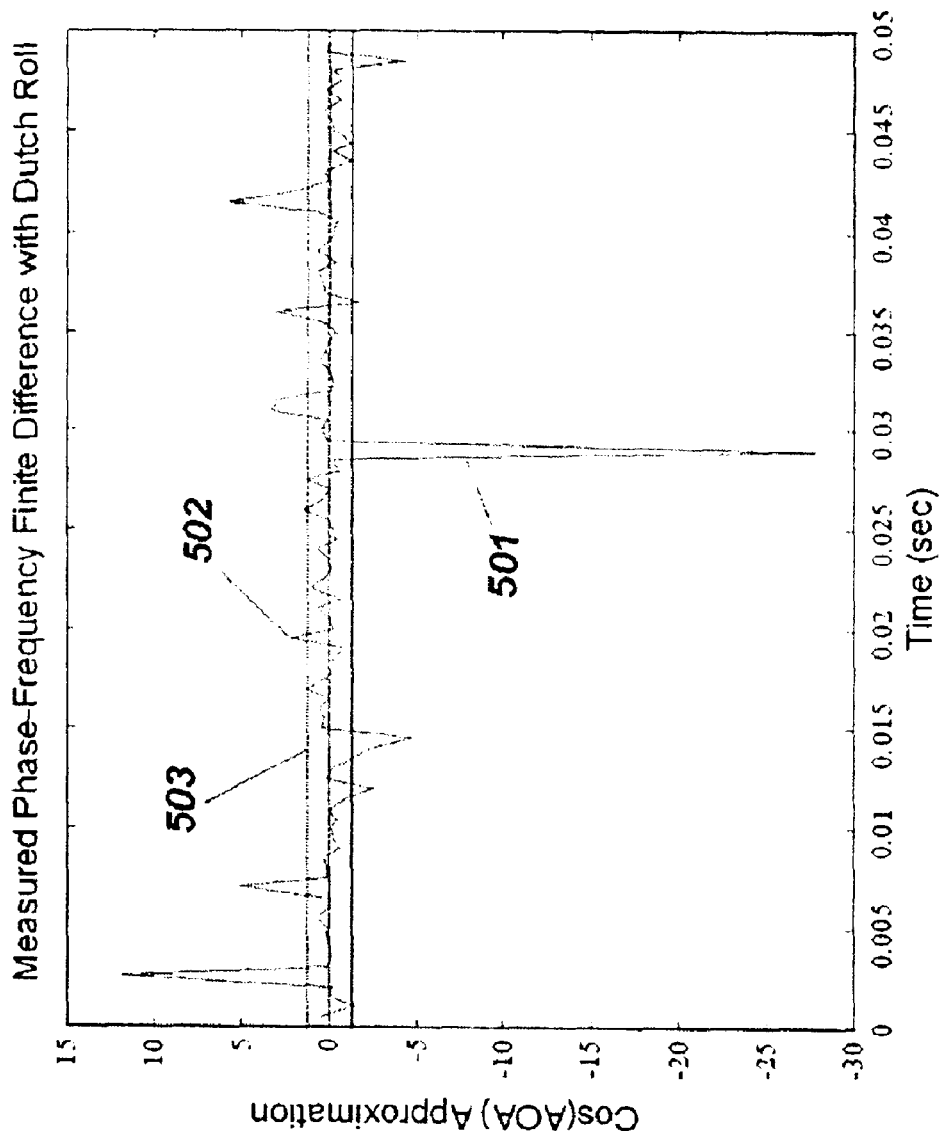
FIG. 5 shows illustrates a typical subset of COS(AOA) estimates found utilizing the method of the '590 patent, with the a simulation assuming a 13 dB video SNR, 500 usec PRI, and damped. Dutch roll of the airframe; the Dutch roll generated small changes in relative angle between the 40 foot LBI baseline and DOA unit vector during phase data collection.
Figure 6:
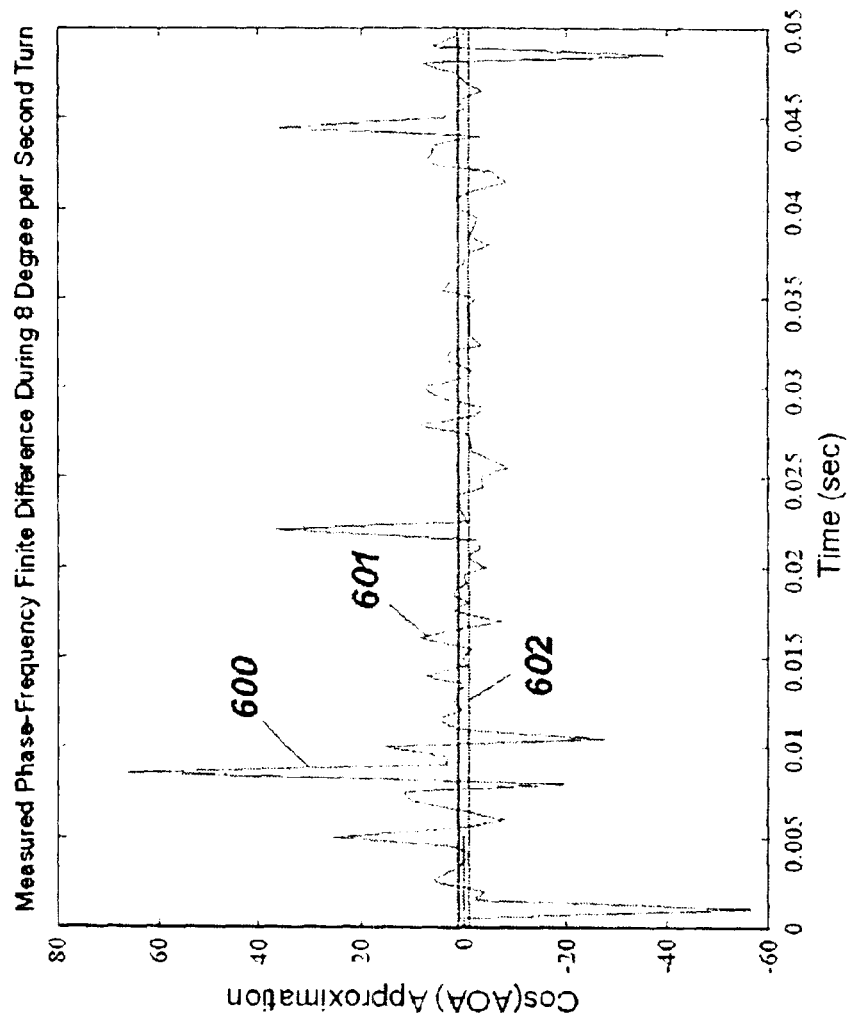
FIG. 6 shows illustrates a typical subset of COS(AOA) estimates found utilizing the method of the '590 patent, with the a simulation assuming a 13 dB video SNR, 500 μsec PRI, and 8° per second yaw during phase data collection; a change in relative angle between the 40 foot LBI baseline and the DOA unit vector caused by the yaw generated a large number of ambiguous phase measurements for random frequency hops in the 100 MHz bandwidth.

When the new method just described was applied to the same cases as the prior method (FIG. 2 of the '590 patent) was tested on using the data shown in FIGS. 4, 5 and 6, a marked improvement in performance was obtained. With the new method, in the ideal case of no baseline rotation (FIG. 4), the 10 phase measurement estimate was seven (7) times more accurate than the prior method estimate using 600 samples. This improvement can be directly attributed to the differencing method of process's step 701, using maximum frequency changes, as opposed to the unambiguous rate computation employed in the prior technique. For the Dutch roll case, 60 pulses were needed to achieve the accuracy required for LBI dwell-to-dwell ambiguity resolution, but the prior method failed to achieve this accuracy with 700 pulses.

For the 8° per second turn, similar to the no baseline rotation result above, only 10 pulses were required; the prior method did not work at all in this case, even with 1200 pulses. Also, the accuracy attained by the method according to an embodiment of the present invention in this rapid-yaw case equaled that achieved by the prior method in the ideal no turn case with 600 pulses. This illustrates another important aspect of the present invention, analogous to the enhancement large frequency changes provide: unlike the prior method, attitude change during the estimation process does not degrade the accuracy but actually improves itthe accuracy. In this last case, all phase measurements were ambiguous. The number of phase measurements required in all three examples was correctly predicted by step 706, FIG. 7. Table I summarizes these results, which show an embodiment according to the present invention meets its objectives and overcomes the deficiencies of the method according to the '590 patent.

TABLE I

Performance Comparison

| | Aircraft Attitude Change | | | | | |
|---|---|---|---|---|---|---|
| | None | | Dutch Roll | | 8°/sec Yaw | |
| | Error (deg) | Number Pulses | Error (deg) | Number Pulses | Error (deg) | Number Pulses |
| Prior Method U.S. Pat. No. 5,652,590 | 3.5° | 10 | 16.5° | 600 | 48.7° | 600 |
| Method of Current Invention | 0.54° | 10 | 0.01° | 60 | 0.01° | 10 |

DESCRIPTION OF PREFERRED EMBODIMENTS

Figure 2:
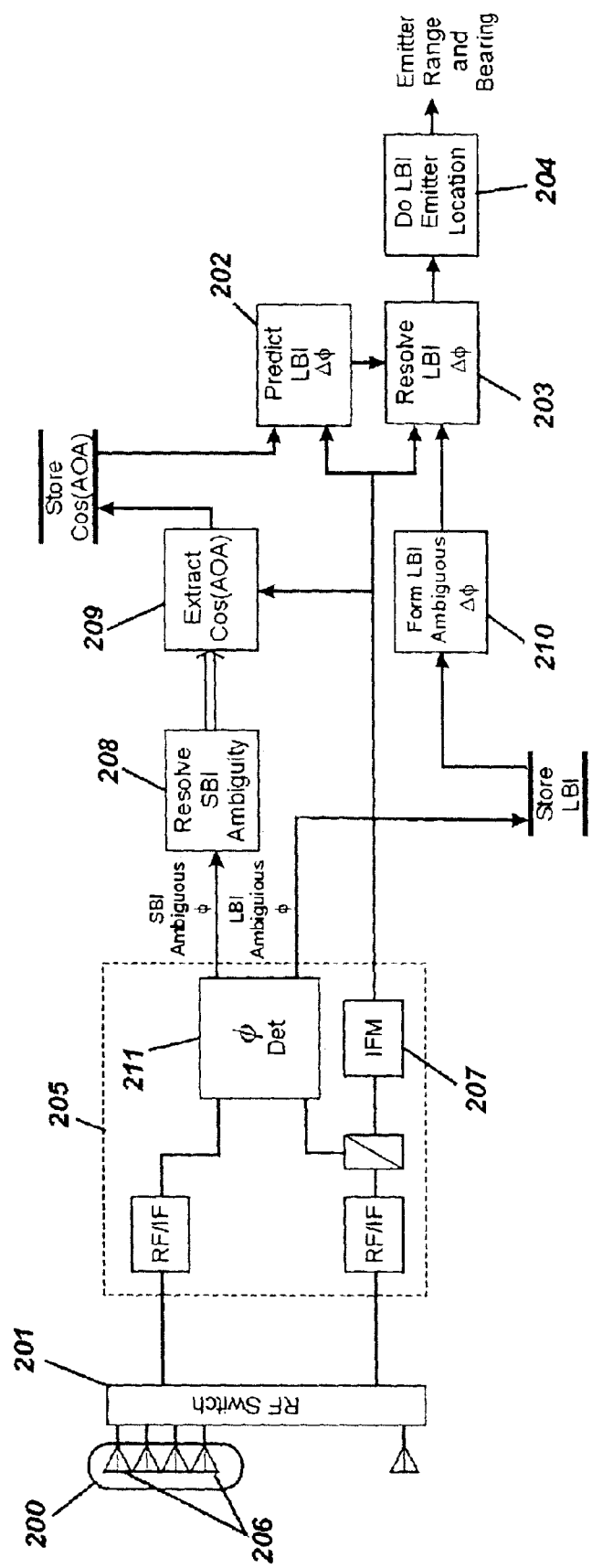
FIG. 2 illustrates an implementation of a SBI/LBI passive emitter location as described by U.S. Pat. No. 4,734,702 issued to Kaplan.
Figure 3:
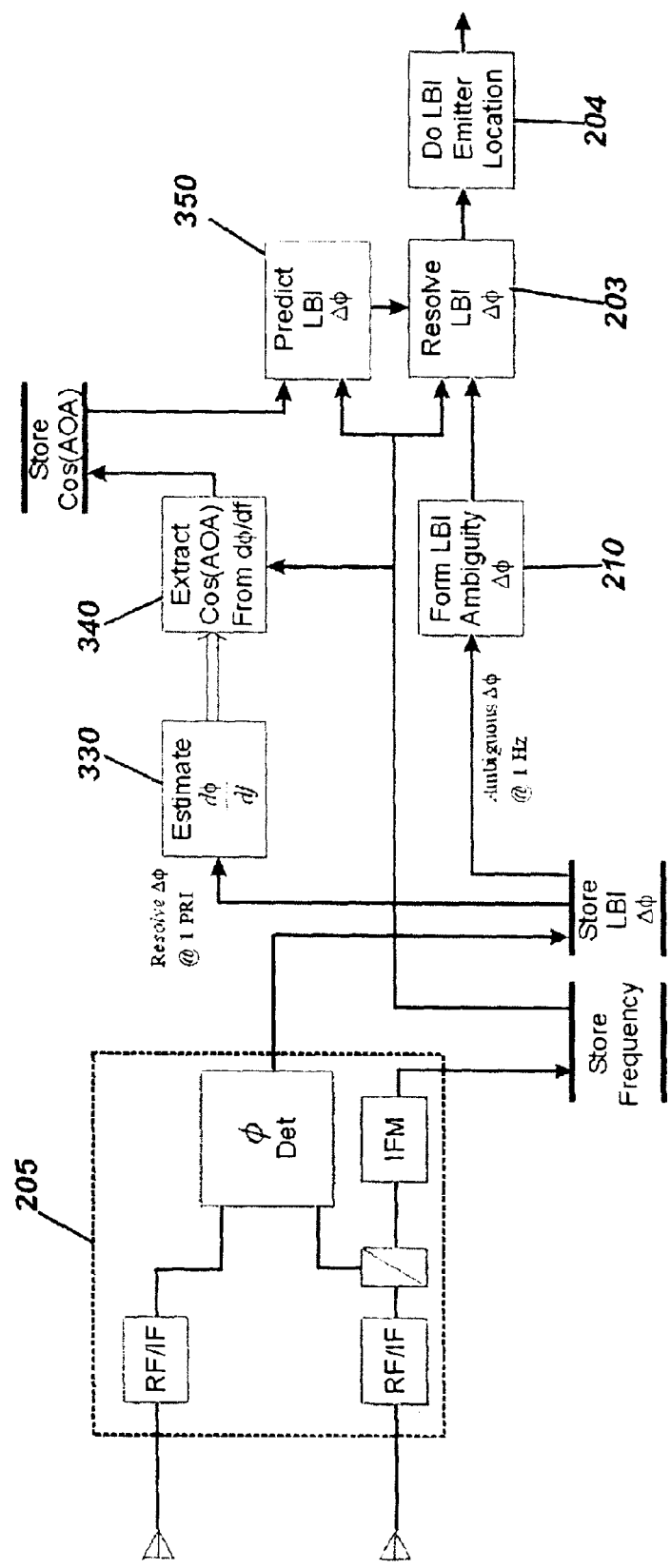
FIG. 3 demonstrates how Kaplan's method, when implemented using switched baselines as shown in FIG. 2, is modified by the technique described in the '590 patent to handle frequency agile signals, and, in particular, pulse-to-pulse frequency agile signals.
Figure 9:
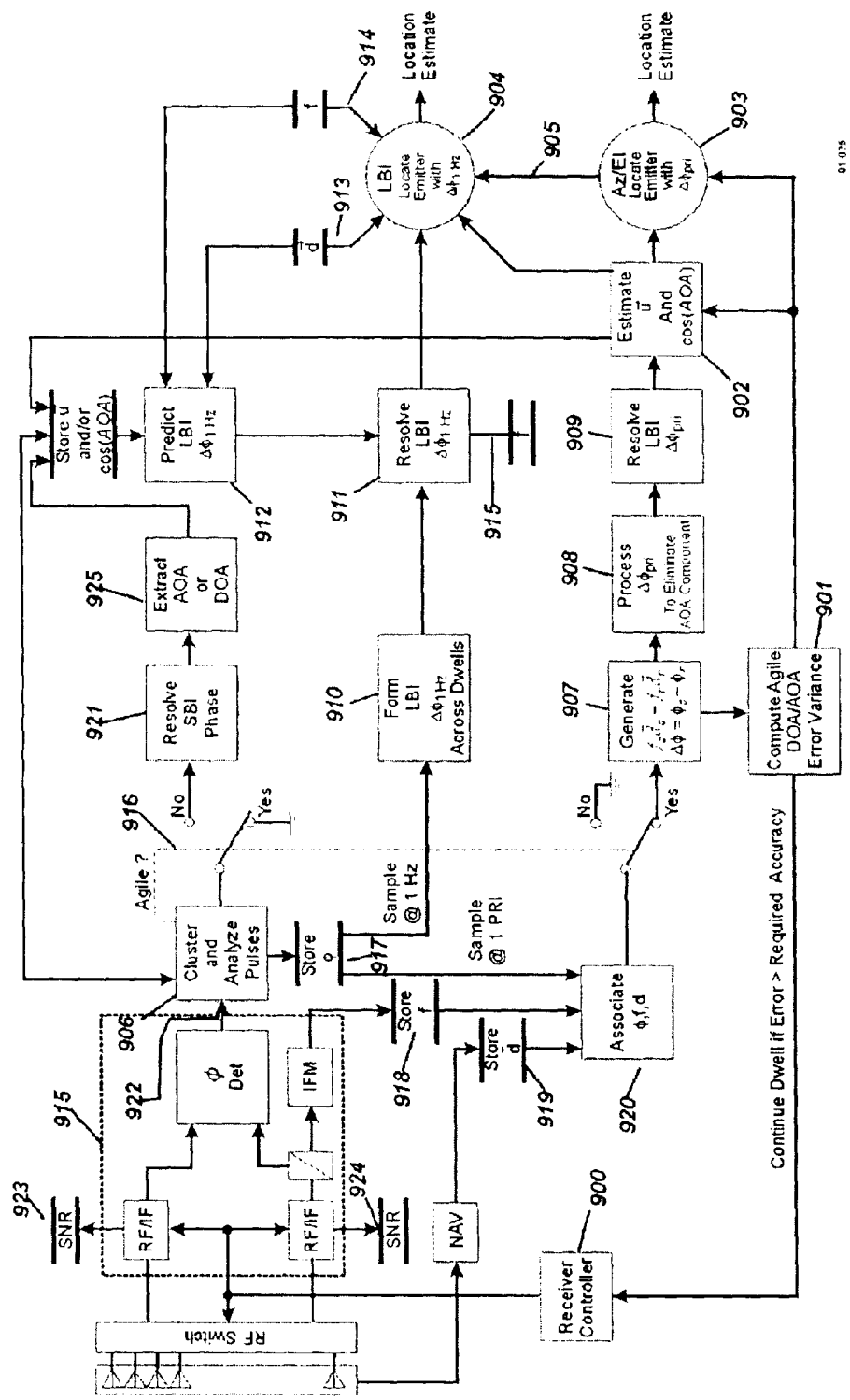
FIG. 9 is a block diagram of a preferred implementation of the present invention.

FIG. 9 illustrates an embodiment according to the present invention in which the switched SBI/LBI system shown in FIG. 2 is modified to incorporate the present invention. A two channel receiver 915 is identical to 205 (FIG. 2). When process 906 detects frequency agile pulses, and associates them with a single emitter, special processing, indicated schematically by switch 916, begins. The initial detection and clustering is best accomplished using the method described in the inventors patent entitled "Apparatus and Method for the Monopulse Linking of Frequency Agile Emitter Pulses Intercepted In On Single Interferometer Baseline", U.S. Pat. No. 6,411,249, issued Jun. 25, 2002. The special processing initiated schematically by switch 916 is process step 700, and then the subsequent steps of FIG. 7. Phase 917, frequency 918 and baseline measurements 919 are stored and synchronized at process step 920 in time for all signals, both stable and agile. Thus, process 920 may involve interpolation to time-align the three sets of measurements. This processing is typically carried on in a conventional SBI/LBI system at a 1 Hz sample rate, and is performed at that rate for stable emitters; however, in the present invention the processing occurs at a 1 PRI rate when an agile emitter is detected and logic switch 916 is closed. The further processing of step 901 of these three measurement sets is central to the implementation of the present invention, and is discussed next.

FIG. 2 does not show the receiver controller 900, since, although invariably present, the controller is not an intrinsic part of the SBI/LBI method. However, controller 900 is intrinsic to the present invention in implementing test 713 (FIG. 7), because the dwell scheduling is driven by process 901 Compute Agile DOA/AOA Error Variance, and the performance of the present invention depends on this scheduling when estimating the DOA unit vector. The preferred method of computing the predicted error variance in process 901 is to consider the FBD generated in process step 907 as a measurement matrix, and use the approach to maximum likelihood estimation, such as presented in Steven M. Kay's *Fundamentals of Statistical Signal Processing: Estimation Theory*, Prentice Hall, New Jersey, 1993, that allows such a measurement matrix to generate the Cramer-Rao lower bound for the achievable estimate accuracy. The signal-to-noise ratio of the phase measurements 923 and 924 may also be incorporated in this calculation. The SNR does not have to be measured and can be assumed to always be the worst case SNR at the signal detection threshold level, i.e., typically 13 dB.

Controller process 901 also determines the rank of the FBD. The rank will be 1 in the very special and restricted case of no baseline rotation during the measurement process 700 (FIG. 7). Then special processing occurs in process steps 908, 909 and most especially in 902 Estimate $\vec{u}$ and COS(AOA) for determining COS(AOA). In cases where specialized processing is not required, generating COS (AOA) is performed by simply dotting the estimated DOA unit vector onto the normalized LBI baseline. The diagram also illustrates process 903 azimuth/elevation (az/el) ranging used as well as LBI emitter location 904. Details on the specialized COS(AOA) processing and reason for the inclusion of az/el emitter location are described next.

Once the DOA unit vector is determined at step 902 (and hence rank FBD>1), the COS(AOA) or level frame azimuth and elevation angles are easily determined. For example, if the baseline vectors are measured in the level frame with axis oriented north-east-down, then the emitter azimuth with respect to north is obtained from $$az = \tan^{-1} \frac{u(2)}{u(1)}$$

Using the 10 phase measurements illustrated in FIG. 8, made during an 8° per second yaw with phase measurement error consistent with 13 dB video SNR, and standard pseudo inverse calculation for $\Lambda$, azimuth was estimated to be 45.01° and elevation 3.80°. The true values were 45.00° and 3.89°.

The angle estimates are accurate enough to bypass LBI ranging step 904 entirely, and use the azimuth and elevation angles in a single dwell alone, so called az/el location 903 to determine emitter range. The notation $\Delta\phi_{pri}$ indicates that the emitter location is determined from data sampled at a rapid rate, on the order of a pulse repetition interval, in contrast to location determination using Kaplan's phase change method 904, which requires data sampled at about one second intervals.

The azimuth and elevation estimation accuracy in this example is directly due to the baseline change during the rapid yaw, and is exceptional. Generally, the accuracy obtained will be good enough to resolve the LBI between 1 Hz updates 911 to perform phase rate location 904, but not as accurate as this example unless there is either a significant attitude change, very large frequency excursions, or a large number of pulses collected. The fundamental controller process 901 determines, via process step 713, if the accuracy is good enough to perform the az/el computation of process step 903. If so, the LBI location processing may not be needed, or the az/el estimate may be incorporated at step 905, e.g. in initializing the LBI estimator.

It is not generally necessary to compute COS(AOA) in process step 902 without first computing $\vec{u}$. When $\vec{u}$ is available, COS(AOA) is not used to resolve the LBI, but may be used by the system elsewhere, e.g. for a pulse clustering check in process 906. Hence, whether this special processing is required or not, it is generally desirable to compute a COS(AOA) estimate in step 902. Many important agile emitters are batch agile, and so the SBI in conventional processing steps 921 and 925 will provide COS(AOA) estimates intermittently. The agile COS(AOA) estimate from step 902 can be correlated with this SBI estimate in process step 906 to assure proper clustering of batch agile pulses.

However as noted above, in certain degenerate cases where there is absolutely no baseline motion, DOA will not be observable and only AOA can be determined. In this case steps 708, 709 and 710 remain essentially the same, but the specific processing used in steps 907, 908 and 909 is modified to handle the change in rank of $[f_l \vec{d}_l - f_k \vec{d}_k]$ from 3 to 1. Thus, for example, with the FBD having rank 1, the weights A now satisfy $$\sum_s a_s (f_l \vec{d}_l - f_k \vec{d}_k)_s = 0$$

As noted, the subscript on the delta-phase in process steps 909 and 903 emphasizes that the phase differences are typically taken over intervals on the order of a PRI, in contrast to the LBI phase difference in process 910, which corresponds to the SBI/LBI process 210 of FIG. 2, typically formed over intervals on the order of a second. Process 911 corresponds to the standard SBI/LBI process step 203, with some straightforward modification, as described below.

The system shown in FIG. 2 is not assumed to be specifically configured for frequency agile emitters. Many of the algorithms implemented using Kaplan's method have been specialized to stable emitters. However, process step 912 corresponding to 202 and process step 911 corresponding to 203 both require inputting frequency 914 and 915 corresponding to the phase 922 at each 1 Hz update to account for frequency change. But these adjustments are straightforward, and analogous to that performed in going from Equation 4 to Equation 5. The LBI location processor 904 frequency agile reconfiguring depends on the specific algorithm used. One with the DOA unit vector or COS (AOA) as the input would require no adjustment from the 204 implementation. The baseline input 913 is required by the unrestricted baseline motion allowed during all the above measurement, ambiguity resolution, and location processing. Hence it is intrinsic to the present invention.

Although modifications to Kaplan's approach have been emphasized here, the unit vector found in process 902 and input 915 to the location algorithm can also be used as an AOA generator as described in Rose et al, "AOA/LBI Emitter Ranging Method and Apparatus", U.S. Pat. No. 5,343,212. When the AOA/LBI method is used, as opposed to one based on the SBI/LBI approach, only a single DOA unit vector is required; therefore, the processes 907, 908, 909, 902 and 903 would only be utilized once per emitter. The unit vector is used to delimit a region in which a set of hypothesized emitter locations are established. Subsequent processing determines the true emitter position from this set without further emitter angle measurements. The 1995 Wright Laboratory report WL-TR-95-1074 "Precision Emitter Location Techniques (PELTS)" by J. J. Drude of Litton Systems, Inc, available from the Air Force Materiel Command, Wright Patterson Air Force Base, Ohio, elaborates on the AOA generator method of U.S. Pat. No. 5,343,212, providing extensive details on using the DOA unit vector, and other emitter signal AOA information, in initializing the hypothesis test for the AOA/LBI. When the AOA/LBI approach is implemented with the method of the present invention the SBI 200 (FIG. 2) may be dispensed with entirely.

It will be readily seen by one of ordinary skill in the art that the present invention fulfills all of the objects set forth above. After reading the foregoing specification, one of ordinary skill will be able to affect various changes, substitutions of equivalents and various other aspects of the invention as broadly disclosed herein. It is therefore intended that the protection granted hereon be limited only b the definition contained in the appended claims and equivalents thereof.

What is claimed is:

1. A method of passively determining agile-frequency-emitter location, comprising the steps of:
   measuring during a single receiver dwell:
      phase at a minimum of three different carrier frequencies on a single interferometer baseline; wherein:
         each frequency measurement occurs with a phase measurement; and
         each corresponding interferometer baseline position, the position simultaneous to the phase and frequency measurements;
   processing the measurements measured by the measuring step by:
      multiplying each baseline by the corresponding frequency;
      forming a linearly independent set of differences of these baseline-frequency products; and
      forming the corresponding set of phase differences;
   determining the measuring step has obtained sufficient phase, frequency and baseline measurements, comprising:
      based on the linearly independent set of differences of baseline-frequency products produced by the processing step, predicting the accuracy of a direction of arrival unit vector or COS(AOA) to be that will be computed from the corresponding set of phase differences;
      repeating the measuring step and processing step until the predicted accuracy meets or exceeds a desired specified accuracy;
   computing an array A of gains based on the set of baseline-frequency product differences, where there is a gain for each difference, and the sum of the differences weighed by each corresponding gain is a null vector;
   computing the phase difference ambiguity integers for all the phase difference measurements by:
      processing the phase difference measurements corresponding to the set of baseline-frequency products by:
         multiplying each phase difference with the corresponding gain, where the gain was previously determined; and summing these products to form a fundamental test metric; forming all possible sequences of permissible ambiguity integers, such that each sequence is an array having the same dimensions as the set of phase differences;
   testing each integer set thus formed by:
      weighting each integer in the set with the corresponding gain determined in the computing an array step;

summing these weighted values; and choosing the sum closest to the fundamental test metric; and resolving the set of phase differences with the set of integers whose sum has the value closest to that of the fundamental test metric by adding the integer array to the phase array;

estimating the emitter DOA unit vector $\vec{u}$ or COS(AOA) by:

computing a second array $\Lambda$ of gains from the set of baseline-frequency product differences, where the matrix product of the gains and differences is the identity matrix;

determining the rank of the set of baseline-frequency product differences;

estimating $\vec{u}$ if the rank is greater than 1, and COS (AOA) otherwise, by forming the matrix product of $\Lambda$ with the phase differences corresponding to the baseline-frequency differences;

predicting the LBI phase differences, the differences occurring between receiver dwells, by:

if the rank of the set of baseline-frequency product differences is greater than 1, performing the steps of:

projecting the DOA unit vector found in each dwell on a single baseline measured in that dwell; and scaling the projected value by the measured frequency corresponding to the baseline measurement;

else if the rank of the set of baseline-frequency product differences is 1, performing the steps of:

forming the product of the COS(AOA) and baseline length;

scaling the product by the measured frequency corresponding to the measured phase being resolved;

resolving the corresponding ambiguous measured phase difference by:

differencing the ambiguous phase difference with the predicted phase difference and estimating the resulting integer value;

adding the integer value to the ambiguous phase; and associating the resolved phase change with spatial angle change and estimating emitter range from the angle change.

2. The method of claim 1 wherein the linearly independent set of differences of the baseline-frequency products is formed by:

determining the linearly independent set of frequency differences having the maximum frequency change; and forming the differences of the corresponding baseline-frequency products.

3. The method of claim 1 wherein, when the rank of the set of baseline-frequency product differences is greater than 1, COS(AOA) is computed by projecting the DOA unit vector onto the interferometer baseline unit vector.

4. The method of claim 1 wherein, in the logic step, in the predicted accuracy test, the desired accuracy is determined by the accuracy required to predict the ambiguity integer in the LBI resolving step, so that the probability the estimated integer is the correct integer exceeds a preset performance threshold.

5. The method of claim 1 where, in the logic step, in the predicted accuracy test, the desired accuracy is determined by the accuracy required to estimate emitter location from the DOA unit vector $\vec{u}$, where this estimation accuracy exceeds a preset performance value.

6. The method of claim 1, wherein the estimation accuracy is predicted from the linearly independent set of differences of baseline-frequency products by utilizing standard maximum likelihood estimation (MLE) processing, with the set of baseline differences identified with the measurement matrix of a linear estimator, and where the predicted accuracy is the Cramer-Rao bound for the corresponding MLE.

7. The method of claim 3, wherein the estimation accuracy is predicted from the linearly independent set of differences of baseline-frequency products by utilizing standard maximum likelihood estimation (MLE) processing, with the set of baseline differences identified with the measurement matrix of a linear estimator, and where the predicted accuracy is the Cramer-Rao bound for the corresponding MLE.

8. The method of claim 4, wherein the estimation accuracy is predicted from the linearly independent set of differences of baseline-frequency products by utilizing standard maximum likelihood estimation (MLE) processing, with the set of baseline differences identified with the measurement matrix of a linear estimator, and where the predicted accuracy is the Cramer-Rao bound for the corresponding MLE.

9. The method of claim 1, wherein the estimated DOA unit vector $\vec{u}$ in a single receiver dwell is used to locate the emitter by extending the line $\vec{u}$ lies on to intersect the earth's surface, the point of intersection being the estimated emitter position.

10. The method of claim 1, wherein the DOA unit vector is utilized to determine emitter azimuth and elevation, and these angles are then used to locate the emitter.

11. The method of claim 1, wherein the associating step performing emitter location also utilizes the DOA unit vectors found in each receiver dwell to locate the emitter in angle as well as range.

12. The method of claim 1, wherein the DOA unit vector is used to establish the initial region for the assumed emitter location grid used in the AOA/LBI hypothesis test for locating the emitter.

13. The method of claim 9, wherein the DOA unit vector is used to establish the initial region for the assumed emitter location grid used in the AOA/LBI hypothesis test for locating the emitter.

14. The method of claim 1, wherein the estimated COS (AOA) is utilized to cluster phase measurements from a batch-agile emitter, comprising:

using a conventional short baseline interferometer (SBI) to obtain COS(AOA) for phase measurements at the same frequency;

comparing the SBI COS(AOA) with the estimated COS (AOA); and associating the pulses with a single emitter if the comparison is within the phase measurement and COS (AOA) estimation error.

15. The method of claim 3, wherein the estimated COS (AOA) is utilized to cluster phase measurements from a batch-agile emitter, comprising:

using a conventional short baseline interferometer (SBI) to obtain COS(AOA) for phase measurements at the same frequency;

comparing the SBI COS(AOA) with the estimated COS (AOA); and associating the pulses with a single emitter if the comparison is within the phase measurement and COS (AOA) estimation error.

16. The method of claim 1, wherein each frequency measurement occurs simultaneous with a phase measurement.

17. The method of claim 1, wherein a frequency measurement simultaneous with a phase measurement is determinable.

18. The method of claim 17, wherein the determinable frequency measurement is determinable by extrapolation and interpolation.

19. An apparatus for passively determining agile-frequency-emitter location, comprising:

measuring means for measuring, during a single receiver dwell, phase at a minimum of three different carrier frequencies on a single interferometer baseline, wherein the measuring means is adapted to measure frequency, phase, and a corresponding interferometer baseline position;

a processor for processing the measurements measured by the measuring means by (1) multiplying each baseline by the corresponding frequency, (2) forming a linearly independent set of differences of the baseline-frequency products, and (3) forming a corresponding set of phase differences;

determining means for determining the measuring step has obtained sufficient phase, frequency, and baseline measurements by being adapted to (1) based on the linearly independent set of differences of baseline-frequency products produced by the processor, predict the accuracy of a direction of arrival unit vector or COS(AOA) to be computed from the corresponding set of phase differences, (2) cause repeated measuring by the measuring means and repeated processing by the processor until a predicted accuracy meets or exceeds a desired specified accuracy;

computing means for computing (1) an array A of gains based on the set of baseline-frequency product differences, where there is a gain for each difference, and the sum of the differences weighted by the corresponding gain is a null vector and (2) the phase difference ambiguity integers for all the phase difference measurements by (a) processing the phase difference measurements corresponding to the set of baseline-frequency products by (i) multiplying each phase difference with the corresponding gain, where the gain was previously determined and (ii) summing the products to form a fundamental test metric; (b) forming all possible sequences of permissible ambiguity integers, such that each sequence is an array having the same dimensions as the set of phase differences; (c) testing each integer set thus formed by (i) weighting each integer in the set with the corresponding gain, (ii) summing the weighted values, and (iii) choosing the sum closest to the fundamental test metric; and (d) resolving the set of phase differences with the set of integers whose sum has the value closest to that of the fundamental test metric by adding the integer array to the phase array;

estimating means for estimating the emitter DOA unit vector or COS(AOA) by (1) computing a second array $\Lambda$ of gains from the set of baseline-frequency product differences, where the matrix product of the gains and differences is the identity matrix, (2) determining the rank of the set of baseline-frequency product differences, (3) estimating $\vec{u}$ if the rank is greater than 1, and COS(AOA) otherwise, by forming the matrix product of $\Lambda$ with the phase differences corresponding to the baseline-frequency differences;

predicting means for predicting the LBI phase differences by (1) if the rank of the set of baseline-frequency product differences is greater than 1, the predicting means being adapted to (a) project the DOA unit vector found in each dwell on a single baseline measured in that dwell, (b) scale the projected value by the measured frequency corresponding to the baseline measurement, and (2) if the rank of the set of baseline-frequency product differences is 1, the predicting means being adapted to (a) form the product of the COS(AOA) and baseline length, (b) scale the product by the measured frequency corresponding to the measured phase being resolved, (c) resolve the corresponding ambiguous measured phase difference by (i) difference the ambiguous phase difference with the predicted phase difference and estimate the resulting integer value, (ii) add the integer value to the ambiguous phase, and (iii) associate the resolved phase change with spatial angle change and estimate emitter range from the angle change.

20. The apparatus of claim 19 wherein the linearly independent set of differences of the baseline-frequency products is formed by:

determining the linearly independent set of frequency differences having the maximum frequency change; and forming the differences of the corresponding baseline-frequency products.

21. The apparatus of claim 19 wherein when the rank of the set of baseline-frequency product differences is greater than 1, COS(AOA) is computed by projecting the DOA unit vector onto the interferometer baseline unit vector.

22. The apparatus of claim 19 wherein the determining means determines the desired accuracy by the accuracy required to predict the ambiguity integer in the LBI resolving step, such that the probability the estimated integer is the correct integer exceeds a preset performance threshold.

23. The apparatus of claim 19 wherein the determining means determines the desired accuracy by the accuracy required to estimate emitter location from the DOA unit vector, wherein the estimation accuracy exceeds a preset performance value.

24. The apparatus of claim 19, wherein the estimation accuracy is predicted from the linearly independent set of differences of baseline-frequency products by utilizing standard maximum likelihood estimation (MLE) processing, with the set of baseline differences identified with the measurement matrix of a linear estimator, and where the predicted accuracy is the Cramer-Rao bound for the corresponding MLE.

25. The apparatus of claim 21, wherein the estimation accuracy is predicted from the linearly independent set of differences of baseline-frequency products by utilizing standard maximum likelihood estimation (MLE) processing, with the set of baseline differences identified with the measurement matrix of a linear estimator, and where the predicted accuracy is the Cramer-Rao bound for the corresponding MLE.

26. The apparatus of claim 22, wherein the estimation accuracy is predicted from the linearly independent set of differences of baseline-frequency products by utilizing standard maximum likelihood estimation (MLE) processing, with the set of baseline differences identified with the measurement matrix of a linear estimator, and where the predicted accuracy is the Cramer-Rao bound for the corresponding MLE.

27. The apparatus of claim 19, wherein the estimated DOA unit vector in a single receiver dwell is used to locate the emitter by extending the line $\vec{u}$ lies on to intersect the earth's surface, the point of intersection being the estimated emitter position.

28. The apparatus of claim 19, wherein the DOA unit vector is utilized to determine emitter azimuth and elevation, and these angles are then used to locate the emitter.

29. The apparatus of claim 19, wherein the association performed to determine emitter location also utilizes the DOA unit vectors found in each receiver dwell to locate the emitter in angle as well as range.

30. The apparatus of claim 19, wherein the DOA unit vector is used to establish the initial region for the assumed emitter location grid used in the AOA/LBI hypothesis test for locating the emitter.

31. The apparatus of claim 27, wherein the DOA unit vector is used to establish the initial region for the assumed emitter location grid used in the AOA/LBI hypothesis test for locating the emitter.

32. The apparatus of claim 19, wherein the estimated COS(AOA) is utilized to cluster phase measurements from a batch-agile emitter, comprising:
   using a conventional short baseline interferometer (SBI) to obtain COS(AOA) for phase measurements at the same frequency;
   comparing the SBI COS(AOA) with the estimated COS(AOA); and
   associating the pulses with a single emitter if the comparison is within the phase measurement and COS(AOA) estimation error.

33. The apparatus of claim 21, wherein the estimated COS(AOA) is utilized to cluster phase measurements from a batch-agile emitter, comprising:
   using a conventional short baseline interferometer (SBI) to obtain COS(AOA) for phase measurements at the same frequency;
   comparing the SBI COS(AOA) with the estimated COS(AOA); and
   associating the pulses with a single emitter if the comparison is within the phase measurement and COS(AOA) estimation error.

34. The apparatus of claim 19, wherein each frequency measurement occurs simultaneous with a phase measurement.

35. The apparatus of claim 19, wherein a frequency measurement simultaneous with a phase measurement is determinable.

36. The apparatus of claim 35, wherein the determinable frequency measurement is determinable by extrapolation and interpolation.

37. A computer-readable medium comprising:
   a data structure for phase, frequency, and baseline position measurements;
   at least one sequence of machine executable instructions in machine form,
wherein execution of the instructions by a processor cause the processor to:
   measure during a single receiver dwell:
      phase at a minimum of three different carrier frequencies on a single interferometer baseline; wherein:
         each frequency measurement occurs with a phase measurement; and
         each corresponding interferometer baseline position, the position simultaneous to the phase and frequency measurements;
   process the measurements measured by the measuring step by:
      multiplying each baseline by the corresponding frequency;
      forming a linearly independent set of differences of these baseline-frequency products; and
      forming the corresponding set of phase differences;
   determine the measuring step has obtained sufficient phase, frequency and baseline measurements, comprising:
      based on the linearly independent set of differences of baseline-frequency products produced by the processing step, predicting the accuracy of a direction of arrival unit vector or COS(AOA) to be that will be computed from the corresponding set of phase differences;
      repeating the measuring step and processing step until the predicted accuracy meets or exceeds a desired specified accuracy;
   compute an array A of gains based on the set of baseline-frequency product differences, where there is a gain for each difference, and the sum of the differences weighed by each corresponding gain is a null vector;
   compute the phase difference ambiguity integers for all the phase difference measurements by:
      processing the phase difference measurements corresponding to the set of baseline-frequency products by:
         multiplying each phase difference with the corresponding gain, where the gain was previously determined; and
         summing these products to form a fundamental test metric;
      forming all possible sequences of permissible ambiguity integers, such that each sequence is an array having the same dimensions as the set of phase differences;
      testing each integer set thus formed by:
         weighting each integer in the set with the corresponding gain;
         summing these weighted values; and
         choosing the sum closest to the fundamental test metric; and
      resolving the set of phase differences with the set of integers whose sum has the value closest to that of the fundamental test metric by adding the integer array to the phase array;
   estimate the emitter DOA unit vector $\vec{u}$ or COS(AOA) by:
      computing a second array Λ of gains from the set of baseline-frequency product differences, where the matrix product of the gains and differences is the identity matrix;
      determining the rank of the set of baseline-frequency product differences;
      estimating $\vec{u}$ if the rank is greater than 1, and COS(AOA) otherwise, by forming the matrix product of Λ with the phase differences corresponding to the baseline-frequency differences;
   predict the LBI phase differences, the differences occurring between receiver dwells, by:
      if the rank of the set of baseline-frequency product differences is greater than 1, performing the steps of:
         projecting the DOA unit vector found in each dwell on a single baseline measured in that dwell; and
         scaling the projected value by the measured frequency corresponding to the baseline measurement;

else if the rank of the set of baseline-frequency product differences is 1, performing the steps of:

forming the product of the COS(AOA) and baseline length;

scaling the product by the measured frequency corresponding to the measured phase being resolved;

resolving the corresponding ambiguous measured phase difference by:

differencing the ambiguous phase difference with the predicted phase difference and estimating the resulting integer value;

adding the integer value to the ambiguous phase; and associating the resolved phase change with spatial angle change and estimating emitter range from the angle change.

38. The computer-readable medium of claim 37 further including a sequence of instructions which, when executed by the processor, cause the processor to form the linearly independent set of differences of the baseline-frequency products by:

determining the linearly independent set of frequency differences having the maximum frequency change; and forming the differences of the corresponding baseline-frequency products.

39. The computer-readable medium of claim 37 further including a sequence of instructions which, when the rank of the set of baseline-frequency product differences is greater than 1, cause the processor to compute COS(AOA) by projecting the DOA unit vector onto the interferometer baseline unit vector.

40. The computer-readable medium of claim 37 further including a sequence of instructions which, when executed by the processor, cause the processor to determine the desired accuracy by the accuracy required to predict the ambiguity integer in the LBI resolving step, such that the probability the estimated integer is the correct integer exceeds a preset performance threshold.

41. The computer-readable medium of claim 37 further including a sequence of instructions which, when executed by the processor, cause the processor to determine the desired accuracy by the accuracy required to estimate emitter location from the DOA unit vector, wherein the estimation accuracy exceeds a preset performance value.

42. The computer-readable medium of claim 37 further including a sequence of instructions which, when executed by the processor, cause the processor to predict estimation accuracy from the linearly independent set of differences of baseline-frequency products by utilizing standard maximum likelihood estimation (MLE) processing, with the set of baseline differences identified with the measurement matrix of a linear estimator, and where the predicted accuracy is the Cramer-Rao bound for the corresponding MLE.

43. The computer-readable medium of claim 39, wherein the estimation accuracy is predicted from the linearly independent set of differences of baseline-frequency products by utilizing standard maximum likelihood estimation (MLE) processing, with the set of baseline differences identified with the measurement matrix of a linear estimator, and where the predicted accuracy is the Cramer-Rao bound for the corresponding MLE.

44. The computer-readable medium of claim 40, wherein the estimation accuracy is predicted from the linearly independent set of differences of baseline-frequency products by utilizing standard maximum likelihood estimation (MLE) processing, with the set of baseline differences identified with the measurement matrix of a linear estimator, and where the predicted accuracy is the Cramer-Rao bound for the corresponding MLE.

45. The computer-readable medium of claim 37, wherein the estimated DOA unit vector in a single receiver dwell is used to locate the emitter by extending the line $\vec{u}$ lies on to intersect the earth's surface, the point of intersection being the estimated emitter position.

46. The computer-readable medium of claim 37, wherein the DOA unit vector is utilized to determine emitter azimuth and elevation, and these angles are then used to locate the emitter.

47. The computer-readable medium of claim 37, wherein the association performed to determine emitter location also utilizes the DOA unit vectors found in each receiver dwell to locate the emitter in angle as well as range.

48. The computer-readable medium of claim 37, wherein the DOA unit vector is used to establish the initial region for the assumed emitter location grid used in the AOA/LBI hypothesis test for locating the emitter.

49. The computer-readable medium of claim 45, wherein the DOA unit vector is used to establish the initial region for the assumed emitter location grid used in the AOA/LBI hypothesis test for locating the emitter.

50. The computer-readable medium of claim 37, wherein the estimated COS(AOA) is utilized to cluster phase measurements from a batch-agile emitter, comprising:

using a conventional short baseline interferometer (SBI) to obtain COS(AOA) for phase measurements at the same frequency;

comparing the SBI COS(AOA) with the estimated COS(AOA); and associating the pulses with a single emitter if the comparison is within the phase measurement and COS(AOA) estimation error.

51. The computer-readable medium of claim 39, wherein the estimated COS(AOA) is utilized to cluster phase measurements from a batch-agile emitter, comprising:

using a conventional short baseline interferometer (SBI) to obtain COS(AOA) for phase measurements at the same frequency;

comparing the SBI COS(AOA) with the estimated COS(AOA); and associating the pulses with a single emitter if the comparison is within the phase measurement and COS(AOA) estimation error.

52. The computer-readable medium of claim 37, wherein each frequency measurement occurs simultaneous with a phase measurement.

53. The computer-readable medium of claim 37, wherein a frequency measurement simultaneous with a phase measurement is determinable.

54. The computer-readable medium of claim 53, wherein the determinable frequency measurement is determinable by extrapolation and interpolation.

* * * * *